(12) United States Patent
Luo et al.

(10) Patent No.: US 8,661,117 B2
(45) Date of Patent: Feb. 25, 2014

(54) SYSTEMS AND METHODS FOR MANAGING FAULTS IN A NETWORK

(75) Inventors: Weiya Luo, Boxborough, MA (US); Anthony Worgrin Confrey, Newton, MA (US); Michael L. Turok, Peabody, MA (US); Bruce Wilson, Arlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 116 days.

(21) Appl. No.: 12/399,685

(22) Filed: Mar. 6, 2009

(65) Prior Publication Data

US 2009/0234946 A1 Sep. 17, 2009

Related U.S. Application Data

(62) Division of application No. 11/549,978, filed on Oct. 17, 2006, now Pat. No. 7,502,854, which is a division of application No. 09/702,303, filed on Oct. 31, 2000, now Pat. No. 7,139,819.

(51) Int. Cl.
*G06F 15/173* (2006.01)
*G06F 3/048* (2013.01)

(52) U.S. Cl.
USPC ........... 709/224; 709/223; 715/790; 715/791; 715/792; 715/793

(58) Field of Classification Search
USPC ........... 709/223, 224; 715/790, 791, 792, 793
See application file for complete search history.

(56) References Cited

U.S. PATENT DOCUMENTS

| | | |
|---|---|---|
| 5,764,955 A | 6/1998 | Doolan |
| 5,812,784 A | 9/1998 | Watson et al. |
| 5,955,946 A | 9/1999 | Beheshti et al. |
| 6,012,088 A | 1/2000 | Li et al. |
| 6,044,372 A | 3/2000 | Rothfus et al. |
| 6,118,936 A | 9/2000 | Lauer et al. |
| 6,154,212 A | 11/2000 | Eick et al. |
| 6,301,336 B1 | 10/2001 | Branton et al. |
| 6,339,789 B1 | 1/2002 | Sugauchi et al. |
| 6,343,290 B1 * | 1/2002 | Cossins et al. ......................... 1/1 |
| 6,356,282 B2 | 3/2002 | Roytman et al. |
| 6,385,204 B1 | 5/2002 | Hoefelmeyer et al. |
| 6,424,933 B1 * | 7/2002 | Agrawala et al. ................. 703/2 |
| 6,427,170 B1 | 7/2002 | Sitaraman et al. |
| 6,591,337 B1 | 7/2003 | DeKoning et al. |
| 6,601,185 B1 | 7/2003 | Bass et al. |
| 6,636,891 B1 | 10/2003 | LeClair et al. |
| 6,766,368 B1 | 7/2004 | Jakobson et al. |
| 6,985,901 B1 | 1/2006 | Sachse et al. |
| 7,099,669 B2 * | 8/2006 | Sheffield ....................... 455/446 |
| 2002/0055996 A1 * | 5/2002 | Sugauchi et al. ............. 709/223 |

* cited by examiner

*Primary Examiner* — David Lazaro
*Assistant Examiner* — Vitali Korobov

(57) ABSTRACT

A system (130) improves network management. The system (130) associates an event in the network with a network device and provides a geographical map (710). The geographical map (710) displays locations of network devices and indicates which network devices are associated with at least one event.

18 Claims, 11 Drawing Sheets

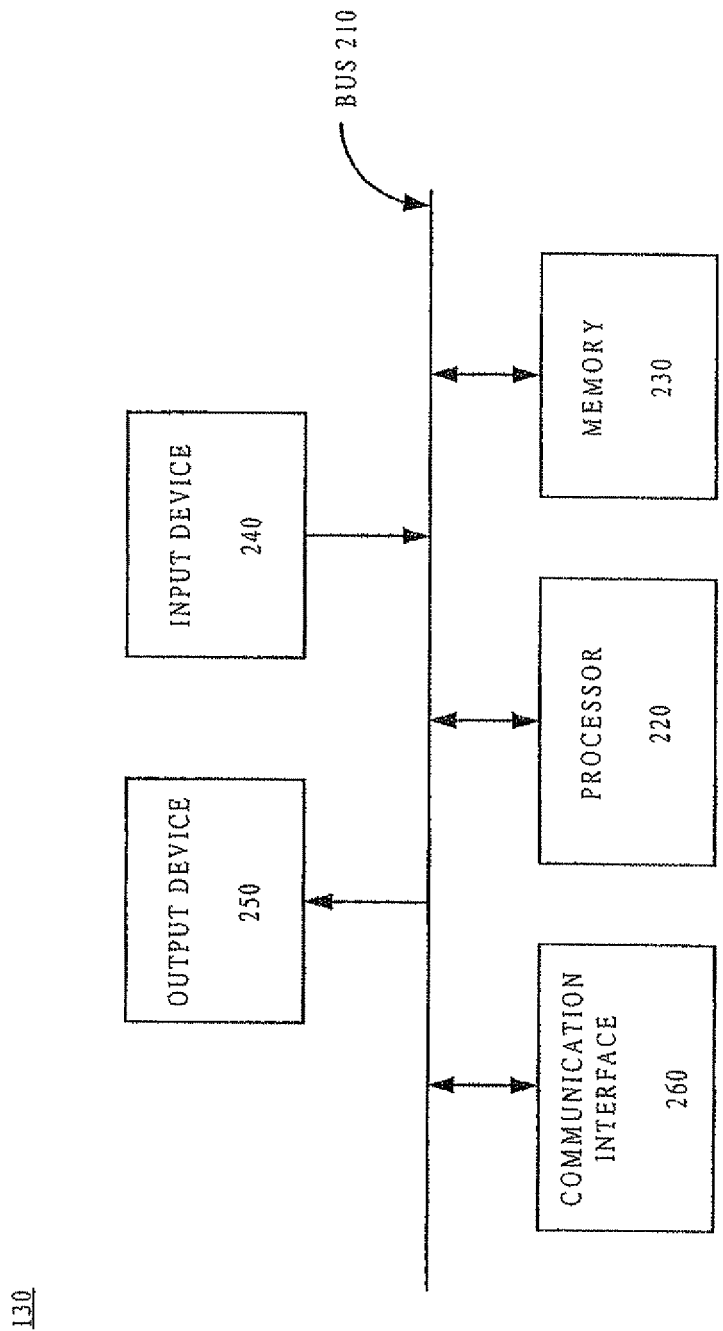

| ALARM TYPE 311 | NUMBER 312 | STATE 313 | ACTION 314 | TIME 315 | DATE 316 | NE ID 317 | ALARM DESCRIPTION 318 |
|---|---|---|---|---|---|---|---|
| FIRE | 5 | E | | 18:34:22 | 11/02/99 | ABCDEFG03H | ALARM DESCRIPTION |
| LINE | 1 | E | | 18:34:24 | 11/02/99 | ABCDEFG03H | ALARM DESCRIPTION |
| LINE | 1 | AE | | 18:34:28 | 11/02/99 | ABCDEFG03H | ALARM DESCRIPTION |
| PORT | 1 | E | | 18:34:28 | 11/02/99 | ABCDEFG03H | ALARM DESCRIPTION |
| LINE | 2 | A | PA | 18:34:29 | 11/02/99 | ABCDEFG03H | ALARM DESCRIPTION |
| PORT | 1 | E | | 18:34:29 | 11/02/99 | ABCDEFG03H | ALARM DESCRIPTION |

| NE | ID | ALARMS | | | | | TT | HA | NOTES | IN | USERS | EA | LAST MODIFIED |
|---|---|---|---|---|---|---|---|---|---|---|---|---|---|
| | | C | MA | MI | I | TOTAL | | | | | | | |
| FR SWITCH | ABCDEFG03H | 32 | 35 | 54 | 9 | 130 | 20 | | 14 | | 2 | | 11/02/1999 11:38:34 |
| ATM SWITCH | ABCDEFG04H | 21 | 98 | 20 | 10 | 149 | 21 | 3 | 2 | 1 | 4 | 1 | 11/02/1999 11:39:42 |
| IP ROUTER | ABCDEFG05H | 0 | 0 | 0 | 95 | 95 | 25 | | 4 | | 1 | | 11/02/1999 11:38:34 |
| FR SWITCH | ABCDEFG06H | 0 | 0 | 0 | 87 | 87 | | | | | 1 | | 11/02/1999 11:38:34 |
| ATM SWITCH | ABCDEFG07H | 0 | 0 | 0 | 64 | 64 | 2 | | | | 1 | | 11/02/1999 11:38:34 |
| ATM SWITCH | ABCDEFG08H | 0 | 20 | 0 | 0 | 20 | | | 1 | | 1 | | 11/02/1999 11:37:51 |

FIG. 3B

SYSTEMS AND METHODS FOR MANAGING FAULTS IN A NETWORK

This application is a divisional application of U.S. patent application Ser. No. 11/549,978, filed Oct. 17, 2006, which is a divisional application of U.S. patent application Ser. No. 09/702,303, filed Oct. 31, 2000 (now U.S. Pat. No. 7,139,819), the entire contents of both applications being incorporated herein by reference.

FIELD OF THE INVENTION

The present invention relates generally to networks and, more particularly, to systems and methods for improving network management.

BACKGROUND OF THE INVENTION

Presently, the act of troubleshooting a network is a time-consuming task. Several solutions exist that aid network administrators in managing faults in a network by providing various tools for collecting and viewing individual faults (i.e., alarms) and performing a set of operations on them (e.g., acknowledge, clear, escalate, etc.). Typically, these views are variations on tabular displays (i.e., rows of alarms) and two-dimensional (2D) topology displays (i.e., network maps).

These tools are generally adequate for small-to-medium scale network operation centers, such as network operation centers with less than 100 alarms/per shift/per monitoring technician, moderate requirements on the frequency of network upgrades, etc. In environments with a large number of network elements and high alarm rates, however, these tools are often limited with respect to their ability to display relevant, real-time, fault information to monitoring technicians and network operation center's management. These limitations often invalidate the use of available tools in support of large-scale network operations.

Therefore, there exists a need for systems and methods that facilitate the management of a network.

SUMMARY OF THE INVENTION

A system and method consistent with the present invention address this and other needs by providing a mechanism that facilitates network management.

In accordance with the purpose of the invention as embodied and broadly described herein, a method for managing a network includes providing a first list of events occurring in the network; simultaneously providing a second list of events occurring in the network, the second list comprising a predetermined number of most recent events; and managing the network using the first and second lists.

In another implementation consistent with the present invention, a device for managing a network having a plurality of network elements includes a memory and a processor. The processor provides a list of identifiers associated with the plurality of network elements, where each network element identifier is associated with a state indication.

In yet another implementation consistent with the present invention, a method for managing a network having a plurality of network devices includes associating events in the network with one of the plurality of network devices; providing a geographical map, the geographical map displaying locations of each of the plurality of network devices and indicating which of the plurality of network devices are associated with at least one event; and managing the network using the geographical map.

In still yet another implementation consistent with the present invention, a device for managing a network having a plurality of network elements includes a memory and a processor. The processor associates each network element with one of a plurality of logical planes and provides a network map. The network map displays relationships between the plurality of logical planes and those network elements associated with the plurality of logical planes.

In still another implementation consistent with the present invention, a system for managing a network having a plurality of network elements includes a user device and a server. The user device provides a user with a list of network management options, the options including a network element diagnostic option, a network summary option, a geographical network management option, a three-dimensional network management option, transmits, in response to a selection of an option by the user, a request for current network information, provides the user with current network information according to the selected option. The server receives the request for current network information and transmits current network information to the user device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2 illustrates an exemplary server consistent with the present invention;

FIGS. 3A and 3B illustrate exemplary databases consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide a mechanism to improve network management. The mechanism simplifies the manner in which a user (e.g., a network engineer) analyzes the operation of the network by providing the user with several graphical user interfaces. The graphical user interfaces allow the user to manage the network in a variety of ways.

Exemplary System

Figure 1:
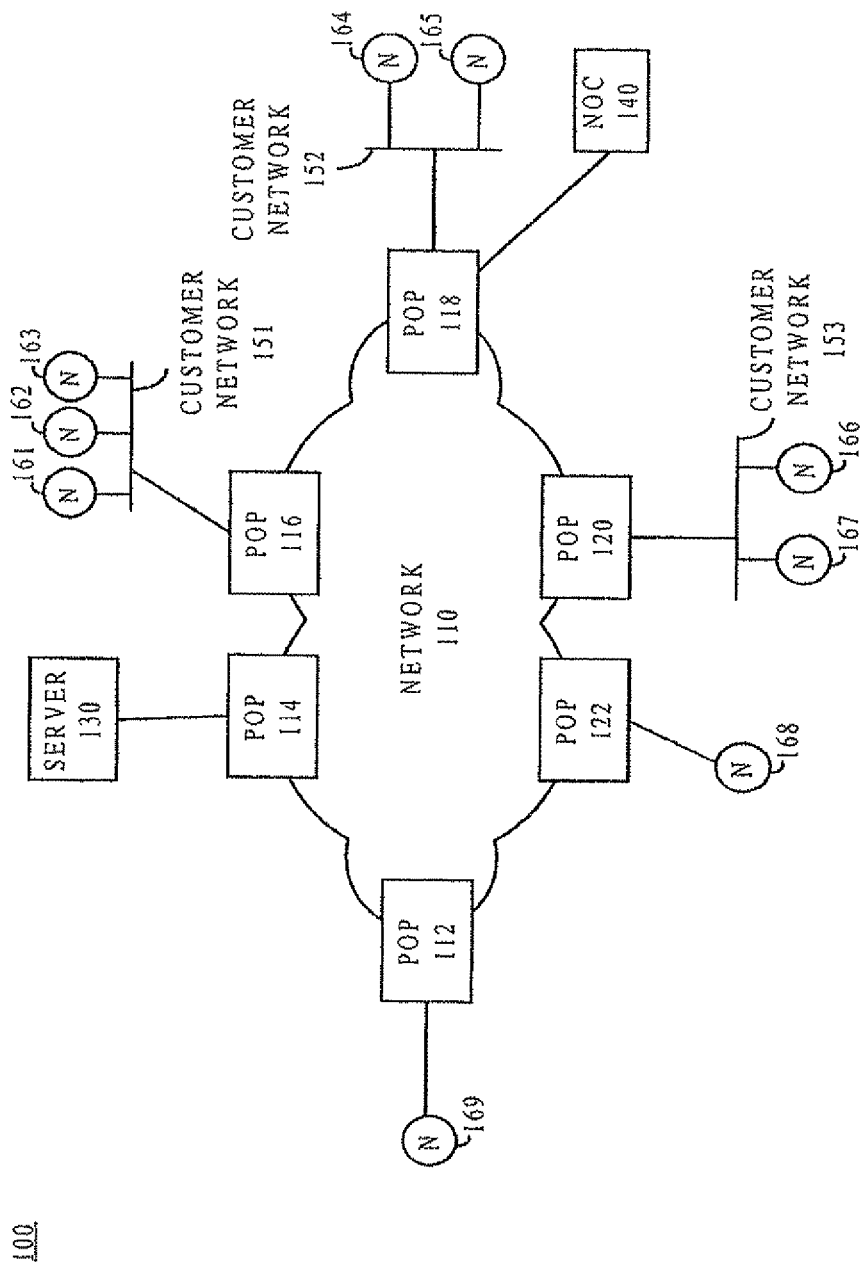
FIG. 1 illustrates an exemplary system in which systems and methods, consistent with the present invention, may be implemented.

FIG. 1 illustrates an exemplary system 100 in which systems and methods, consistent with the present invention, that improve management of a network may be implemented. In FIG. 1, system 100 includes a network 110, points of presence (POPs) 112-122, a server 130, a network operations center (NOC) 140, and a group of nodes 161-169 that may be directly connected to a POP 112-122 or connected via a customer network 151-153.

The network 110 may include, for example, the Internet, an intranet, a local area network (LAN), a metropolitan area network (MAN), a wide area network (WAN), or the like. In fact, the network 110 may include any type of network or combination of networks that permits routing of information from a particular source to a particular destination.

The POPs 112-122 may include conventional routers that decide, based on routing protocols (e.g., a frame relay protocol) and routing tables, how and where to send packets of information. Each POP 112-122 may also include one or more servers, such as an e-mail server or a World Wide Web server. Each POP 112-122 may be implemented via hardware and/or software.

The server 130 may include any type of computer system, such as a mainframe, minicomputer, or personal computer, capable of connecting to the network 110 to communicate with other devices, such as the network operations center 140, in the system 100. In alternative implementations, the server 130 may include a mechanism for directly connecting to the network operations center 140 or may be included within network operations center 140. The server 130 may also include a mechanism for communicating with the nodes 161-169. The server 130 may transmit data over network 110 or receive data from the network 110 via a wired, wireless, or optical connection.

The network operations center 140 may include any type of computer system, such as a mainframe, minicomputer, personal computer, laptop, personal digital assistant, or the like, capable of connecting to the network 110. The network operations center 140 monitors and manages the operation of the network 110. The network operations center 140 may transmit data over the network 110 or receive data from the network 110 via a wired, wireless, or optical connection.

The customer networks 151-153 may include any type of local network, such as a LAN, MAN, WAN, or the like, that permits routing of information packets among the nodes connected to the respective network. The nodes 161-169 may include computers, such as workstations and servers, or any other type of device that has a network interface card (NIC), such as a printer or modem. Moreover, the nodes 161-169 may include devices, such as a personal digital assistant, that connect to a particular local network via a wireless connection.

The number of components illustrated in FIG. 1 is provided for simplicity. In practice, a typical system 100 may include a larger or smaller number of networks, POPs, servers, network operations centers, customer networks, and/or nodes.

Exemplary Server Configuration

FIG. 2 illustrates an exemplary server 130 consistent with the present invention. The server 130 includes a bus 210, a processor 220, a memory 230, an input device 240, an output device 250, and a communication interface 260. The bus 210 may include one or more conventional buses that permit communication among the components of the server 130.

The processor 220 may include any type of conventional processor or microprocessor that interprets and executes instructions. The memory 230 may include a random access memory (RAM) or another type of dynamic storage device that stores information and instructions for execution by the processor 220; a read only memory (ROM) or another type of static storage device that stores static information and instructions for use by the processor 220; and/or some other type of magnetic or optical recording medium and its corresponding drive.

The input device 240 may include one or more conventional mechanisms that permit an operator to input information to the server 130, such as a keyboard, a mouse, a pen, voice recognition and/or biometric mechanisms, and the like. The output device 250 may include one or more conventional mechanisms that output information to the operator, including a display, a printer, a speaker, etc. The communication interface 260 may include any transceiver-like mechanism that enables the server 130 to communicate with other devices and/or systems. For example, the communication interface 260 may include mechanisms for communicating with the network operations center 140 via a network, such as network 110 (FIG. 1).

Execution of the sequences of instructions contained in memory 230 causes processor 220 to provide current network information as described below. In alternative embodiments, hard-wired circuitry may be used in place of or in combination with software instructions to implement the present invention. Thus, the present invention is not limited to any specific combination of hardware circuitry and software.

The server 130, consistent with the present invention, provides information from one or more databases to a graphical user interface at the network operations center 140. The database may be stored at the server 130 (e.g., in memory 230) or externally from server 130.

FIGS. 3A and 3B illustrate exemplary databases 310 and 330, respectively, consistent with the present invention. It will be appreciated that server 130 may consist of other databases stored locally or distributed throughout the network 110.

As illustrated, database 310 includes a group of entries 305 that relate to events that occurred in the network 110. Each entry 305 may include information stored in one more of the following exemplary fields: an alarm type field 311, an optional number field 312, a state field 313, an action field 314, a time field 315, a date field 316, a network element (NE) identifier (ID) field 317, and an alarm description field 318. Database 310 may contain additional or different fields that would aid the server 130 in searching and sorting information in database 310. While information for a single network element (ABCDEFG03H) is illustrated in FIG. 3A, it will be appreciated that database 310 may include information for more than one network element.

The alarm type field 311 may store an identifier indicating the type of alarm associated with a network element. Typical alarms may include, for example, a fire alarm, a port alarm, a line alarm, and the like. The alarm type field 311 may include a subfield (not shown) that stores a variable indicative of the severity of a corresponding alarm. Alarm severity categories might include critical, major, minor, and informational. The optional number field 312 may store an indication of the number of alarms represented by a single alarm icon.

The state field 313 may store an indication, represented by one or more letters, of the state of the alarm. For example, an "A" may represent an acknowledged alarm, an "E" may represent an escalated alarm state, an "AE" may represent an alarm that has been acknowledged and escalated, and a "C" may represent that an alarm has been cleared. The state field 313 may be left blank to indicate that an alarm has not been acknowledged, escalated, or cleared. The state field 313 may include one or more variables to indicate that the alarms associated with a network element are in the same state or in different states.

The action field 314 may store an indication of the type of action taken on an alarm. For example, an indication of "PA" may represent that activity for this particular alarm is planned. The action field 314 may be left blank when no action has been taken on the alarm. The time field 315 may store an indication of the time that the alarm occurred. The time may, for example, be stored in HH:MM:SS format or some other format. The date field 316 may store an indication of the date that the event occurred. The date may, for example, be stored in MM/DD/YYYY format or some other format.

The NE ID field 317 may store an identifier of the network element on which the alarm occurred. The NE ID field 317 may, for example, store the identifier as a Common Language Location Identifier (CLLI). Other techniques for identifying the network element may alternatively be used.

The alarm description field 318 may store information describing the problem associated with the alarm. The alarm description field 318 may include, for example, an indication that a fire has been detected at a particular network element, an identity of a particular port that has failed, or the like. The database 310 may also include an acknowledgement field (not shown) that stores an identifier associated with the user (if any) that acknowledged the alarm.

Database 330 (FIG. 3B) may include a group of entries 325 that relate to events that occurred in the network 110. Each entry 325 may include information stored in one or more of the following exemplary fields: a network element field 331, an ID field 332, an alarms field 333, a tickets (TT) field 334, a held alarms (HA) field 335, a notes field 336, an incidents (IN) field 337, a users field 338, an escalated alarm field 339, and a last modified field 340. Database 330 may include additional or different fields that would aid the server 130 in searching and sorting information in the database 330.

The network element field 331 may store one or more identifiers representing the network element type and its alarm state. A typical network element type may include, for example, a frame relay switch, an Asynchronous Transfer Mode (ATM) switch, an Internet Protocol (IP) router, or the like. The network element type may be associated with an identifier representing the network element's alarm state. Typical alarm states could include critical, major, minor, and informational. The ID field 332 may store an identifier of the network element. Similar to database 310, the identifier may be stored as a CLLI.

The alarms field 333 may store information regarding the states of the alarms associated with a particular network element. As illustrated, the alarms field 333 may include a critical state (C) subfield, a major state (MA) subfield, a minor state (MI) subfield, and an informational state (I) subfield. The critical state, major state, minor state, and informational state subfields may store a value indicative of the number of alarms associated with a particular network element that is in that particular state. The alarms field 333 may also include a total alarms subfield that stores a value representing the total number of alarms associated with a particular network element. As illustrated, the network element ABCDEFG03H is associated with 130 total alarms, of which 32 are critical, 35 are major, 54 are minor, and 9 are informational.

The tickets field 334 may store an indication of the number of outstanding trouble tickets that are associated with a network element. The held alarms field 335 may store an indication of the number of outstanding alarms that are on hold. The notes field 336 may store an indication of the number of outstanding notes associated with a particular network element. The notes field 336 may also store the actual notes for the particular network element.

The incidents field 337 may store an indication of the number of outstanding incident reports associated with a network element. The users field 338 may store an indication of the number of operators that are currently monitoring a particular network element. The escalated alarms field 339 may store an indication of the number of escalated alarms associated with a particular network element. The last modified field 340 may store the date and time of the last time in which the information in fields 332-339 for a particular network element has been modified.

Exemplary Network Operations Center

Figure 4:
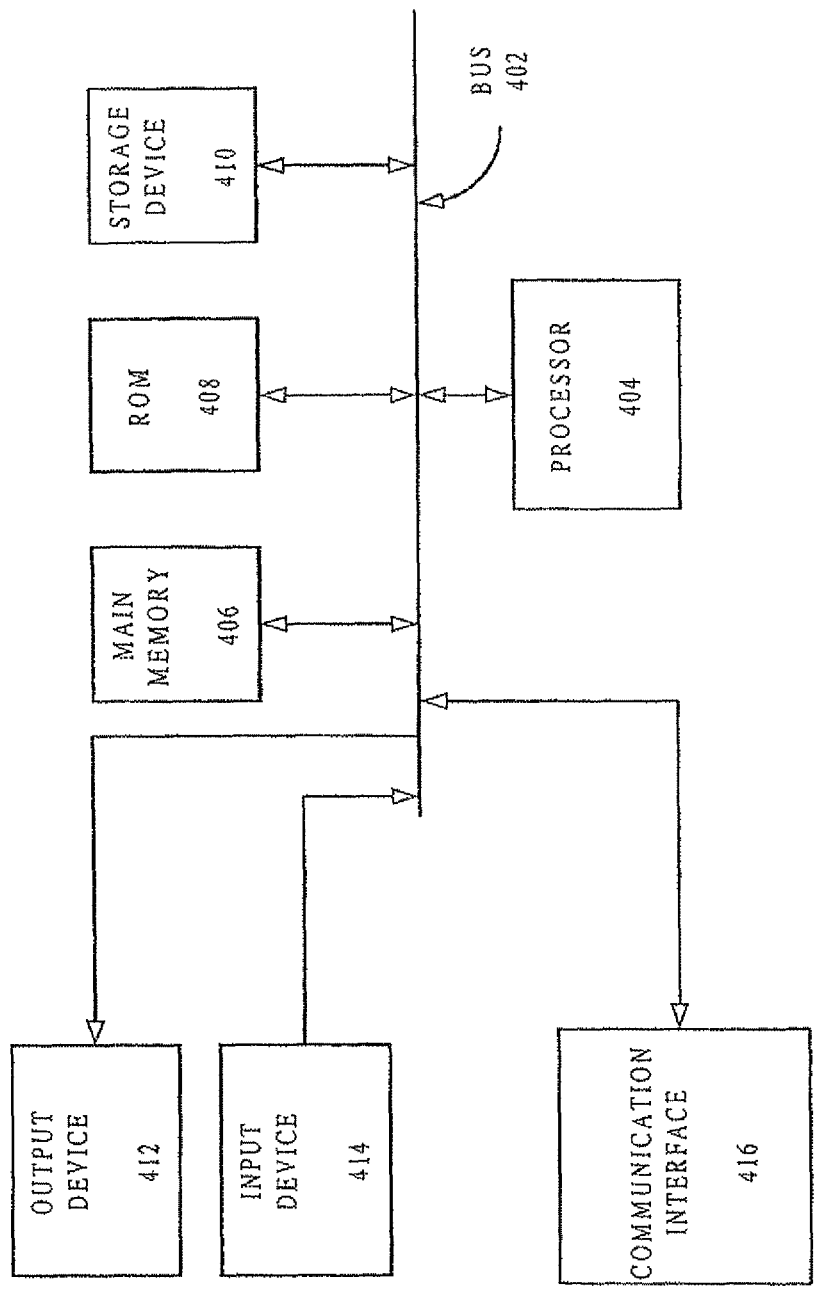
FIG. 4 illustrates an exemplary network operations center consistent with the present invention.

FIG. 4 illustrates an exemplary network operations center 140 consistent with the present invention. The network operations center 140 may include a bus 402, a processor 404, a main memory 406, a ROM 408, a storage device 410, an output device 412, an input device 414, and a communication interface 416. The bus 402 may include one or more conventional buses that permit communication among the components of the network operations center 140.

The processor 404 may include any type of conventional processor or microprocessor that interprets and executes instructions. The main memory 406 may include a RAM or another type of dynamic storage device that stores information and instructions for execution by the processor 404. Main memory 406 may also be used to store temporary variables or other intermediate information during execution of instructions by processor 404.

ROM 408 may include a conventional ROM device and/or another type of static storage device that stores static information and instructions for processor 404. The storage device 410 may include a magnetic disk or optical disk and its corresponding drive and/or some other type of magnetic or optical recording medium and its corresponding drive for storing information and instructions.

The output device 412 may include one or more conventional mechanisms that output information to an operator, including a display, a printer, a speaker, etc. The input device 414 may include one or more conventional mechanisms that permit the operator to input information to the system 140, such as a keyboard, a mouse, a pen, voice recognition and/or biometric mechanisms, etc. The communication interface 416 may include any transceiver-like mechanism that enables the network operations center 140 to communicate with other devices and/or systems, such as the server 130. For example, the communication interface 416 may include a modem or an Ethernet interface to a network. Alternatively, communication interface 416 may include other mechanisms for communicating via a network, such as network 110.

The network operations center 140 improves network troubleshooting in response to processor 404 executing sequences of instructions contained in a computer-readable medium, such as memory 406. Such instructions may be read into memory 406 from another computer-readable medium, such as a storage device 410, or from a separate device via communication interface 416. A computer-readable medium may include one or more storage devices and/or carrier waves. Execution of the sequences of instructions contained in memory 406 causes processor 404 to perform the process steps that will be described hereafter. In alternative embodiments, hard-wired circuitry may be used in place of or in combination with software instructions to implement the present invention. Thus, the present invention is not limited to any specific combination of hardware circuitry and software.

The network operations center 140, consistent with the present invention, provides network management information to an operator via a group of graphical user interfaces. The graphical user interfaces may be provided to the operator at, for example, the network operation center's output device 412 or at an output device located remotely therefrom.

Figure 5:
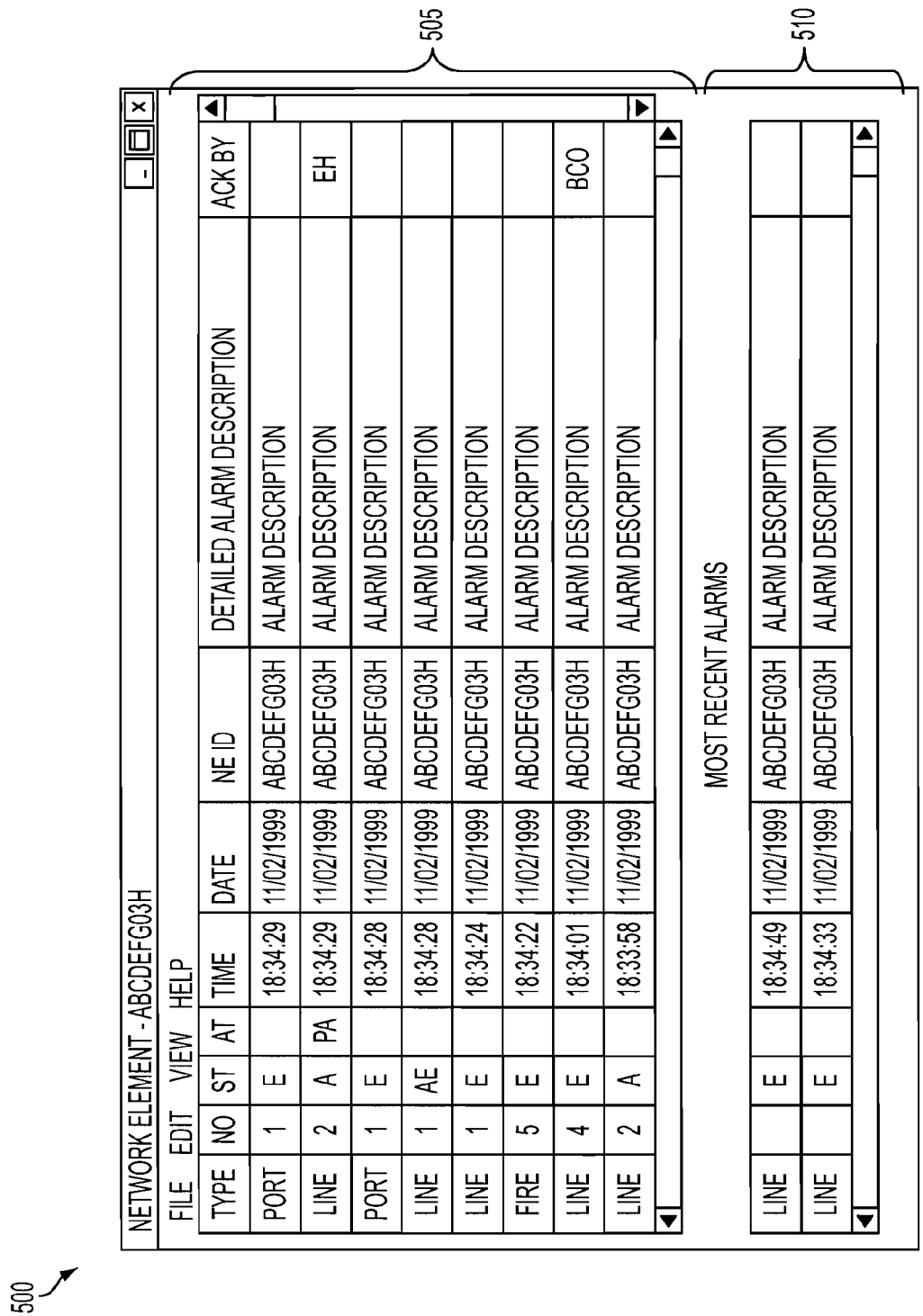
FIGS. 5-8 illustrate exemplary graphical user interfaces, consistent with the present invention, that facilitate network management operations.

FIGS. 5-8 illustrate exemplary graphical user interfaces, consistent with the present invention, that facilitate network management operations. FIG. 5 illustrates a first exemplary graphical user interface 500 consistent with the present invention. In FIG. 5, the exemplary graphical user interface 500 provides an active alarm interface that includes an active alarm window 505 and a most recent alarm window 510 for one or more network elements. For simplicity, the active alarm interface 500 provides alarms associated with a single network element, namely network element ABCDEFG03H.

The active and most recent alarm windows 505 and 510 include the following exemplary fields: a type field, a number (NO) field, a state (ST) field, an action (AT) field, a time field, a date field, a network element (NE) identifier (ID) field, a detailed alarm description field, and an acknowledge field. The type field may include an identifier, in the form of one or more words or icons, indicating the type of alarm associated with a network element. As illustrated, typical alarms may include, for example, a fire alarm, a port alarm, a line alarm, and the like. To illustrate the severity of a particular alarm, the identifiers may be of different colors. For example, dark red may be used to represent a critical alarm, red may be used to represent a major alarm, yellow may be used to represent a minor alarm, and blue may be used to represent an informational alarm.

The number field may include an indication of the number of alarms represented by a single alarm identifier in the type field. The state field may include an indication, represented by one or more letters, of the state of a particular alarm. For example, an "A" may represent an acknowledged alarm, an "E" may represent an escalated alarm state, an "AE" may represent an alarm that has been acknowledged and escalated, and a "C" may represent that an alarm has been cleared. Uppercase letters in the state field may indicate that all alarms associated with a particular network element are in the same state. Lowercase letters may indicate that some, but not all, of the alarms are in the specified state. The state field may be left blank to indicate that an alarm has not been acknowledged, escalated, or cleared. It will be appreciated that other indications may alternatively be used.

The action field may include an indication of the type of action taken on an alarm. For example, an indication of "PA" may represent that activity for this particular alarm is planned. The action field may be left blank when no action has been taken on the alarm. The time field may include the time that a particular alarm occurred. The time may, for example, be represented in HH:MM:SS format or any other format. The date field may include the date that the alarm occurred. The date may, for example, be represented in MM/DD/YYYY format or any other format.

The NE ID field may include an identifier of the network element on which the alarm occurred. The NE ID field may, for example, include the identifier as a Common Language Location Identifier (CLLI). Other techniques for identifying the network element may alternatively be used. If the active and most recent alarm windows 505 and 510 include information for a single network element, as in FIG. 5, the NE ID field may be removed.

The alarm description field may include information describing the problem associated with a particular alarm. The alarm description field may include, for example, an indication that a fire has been detected at a particular network element, an identity of a particular port that has failed, and the like.

The acknowledge field may include one or more initials of an operator that has acknowledged a particular alarm. The active and most recent alarm windows 505 and 510 may include other fields (not shown) that aid a network operator in managing or troubleshooting a network, such as network 110.

The active alarm window 505 provides the operator with a listing of active alarms. As new alarms occur in the network 110, the older alarms are scrolled out of the window 505. Through the use of the scroll bar, the operator may view alarms that have scrolled out of the window 505.

The most recent alarm window 510 displays the most recent alarms in the network 110. The number of most recent alarms displayed may be configured by the operator. When monitoring large networks with high alarm volume, the most recent alarm window 510 ensures that critical alarms (e.g., outages) always show up in the visible area on the operator's screen. Conventional troubleshooting techniques typically have a single active workspace, such as window 505, to view alarms and act on them. It is likely that the newly arrived alarm will get scrolled-off from the visible area in the window, as operators are working on alarms that already exist in the window.

If an operator wants to act on a new alarm immediately upon arrival (e.g., acknowledge it), the operator can select the alarm row in the most recent alarm window 510 and the same alarm instance is automatically selected in the active alarm window 505. The operator may then proceed to acknowledge the alarm in the active alarm window 510.

Figure 6:

FIG. 6 illustrates an alternative exemplary graphical user interface 600 consistent with the present invention. As illustrated, the graphical user interface 600 includes a trouble information matrix that provides an operator with a summary view of each network element in a system, such as system 100. The trouble information matrix 600 may include the following exemplary fields: a network element (NE) field, an identifier (ID) field, an alarms field, a tickets field, a held alarms field, a notes field, an incidents (IN) field, a users (US) field, an escalated alarms (EA) field, and a last modified field.

The network element field may include one or more identifiers, in the form of one or more words or icons, representing a network element type and its alarm state. As illustrated, network element types may include, for example, a frame relay (FR) switch, an Asynchronous Transfer Mode (ATM) switch, an Internet Protocol (IP) router, or the like. To readily identify the severity of the alarms associated with a particular network element, the network element identifiers may be associated with a color. For example, dark red may be used to represent a critical alarm, red may be used to represent a major alarm, yellow may be used to represent a minor alarm, and blue may be used to represent an informational alarm. When a network element is associated with alarms of differing severity, the network element may be associated with a color indicative of the alarm having the highest severity.

The ID field may include an identifier of the network element. In an implementation consistent with the present invention, the identifier may be displayed as a CLLI. The alarms field may include information regarding the states of the alarms associated with a particular network element. The alarms field may include a critical state (CR) subfield, a major state (MAJ) subfield, a minor state (MIN) subfield, an informational state (INFO) subfield, and a total alarms (TOTAL) subfield. The critical state, major state, minor state, and informational state subfields may include a value indicative of the number of alarms associated with a particular network element that is in that particular state. The total alarms subfield may include a value indicative of the total number of alarms associated with a particular network element. As illustrated, the network element ABCDEFG03H is associated with 130 total alarms, of which 32 are critical, 35 are major, 54 are minor, and 9 are informational.

The tickets field may include an indication of the number of outstanding trouble tickets that are associated with a network element. The held alarms field may include an indication of the number of outstanding alarms, associated with a network element, that are on hold. The notes field may include an indication of the number of outstanding notes associated with a particular network element.

The incidents field may include an indication of the number of outstanding incident reports associated with a network element. The users field may include an indication of the number of operators that are currently monitoring the network element. The escalated alarms field may include an indication of the number of alarms associated with a particular network element that have an escalated status. The last modified field may include the date and time of the last time in which information for a particular network element has been modified.

The trouble information matrix 600 provides an operator with the status of events associated with selected network elements and allows the operator to quickly access information in a way not available in conventional systems. For example, selecting a network element in the network element field or on one of the numbers in the alarm field, the operator may be taken to the active alarm interface 500 where an alarm may be acknowledged or acted upon. An operator may select a network element or alarm number by, for example, by a left-click or double-click operation. By selecting a number in the tickets field, the operator may be provided, via, for example, a trouble ticket viewer, with a more detailed view of the the trouble tickets associated with a particular network element.

By selecting a number in the held alarms field, the operator may be taken to a more detailed view of the alarms that are currently on hold for a particular network element. Similarly, by selecting a number in the notes field, the operator may be taken to a notes viewer in which the operator can read the notes associated with a particular network element. More detailed views of the information in the users and escalated alarms fields may be obtained by selecting a number in those fields. For example, an operator may be provided with a list of names and contact information for users that are monitoring a particular network node by selecting the users number in the users field.

Figure 7:
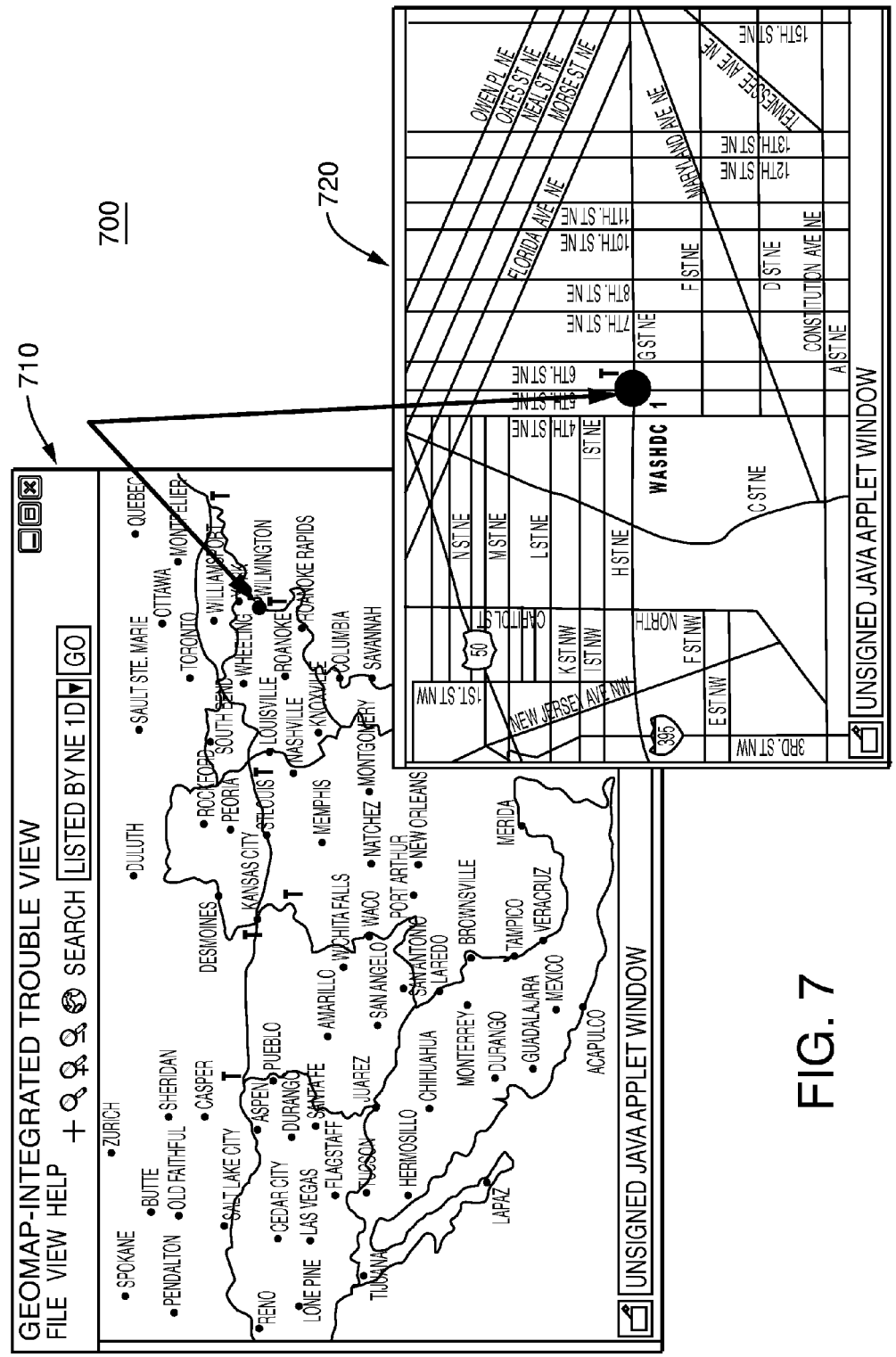

FIG. 7 illustrates another exemplary graphical user interface 700 consistent with the present invention. In FIG. 7, the graphical user interface 700 includes a geographical map 710 that illustrates points of presence and individual network elements according to their geographical location. The graphical user interface 700 also visually maps outstanding trouble tickets to objects displayed in the geographical map 710. If a particular point of presence has outstanding trouble tickets on any network elements housed therein, a small "T" icon may be displayed next to the point of presence icon.

By selecting a particular point of presence or network element that is associated with a trouble ticket, the graphical user interface 700 may provide an operator with a number of options. In one option, the graphical user interface 700 may provide the operator with a more detailed view 720 of the geographical area affected. The operator may also be provided with a "Show Trouble Tickets" menu that allows for trouble tickets to be viewed in a trouble ticket management system of the operator's choice (e.g., Remedy). Similar viewing options may be provided for individual network elements as users "drill down" into a point of presence by selecting the point of presence on the geographical map 710.

Figure 8:
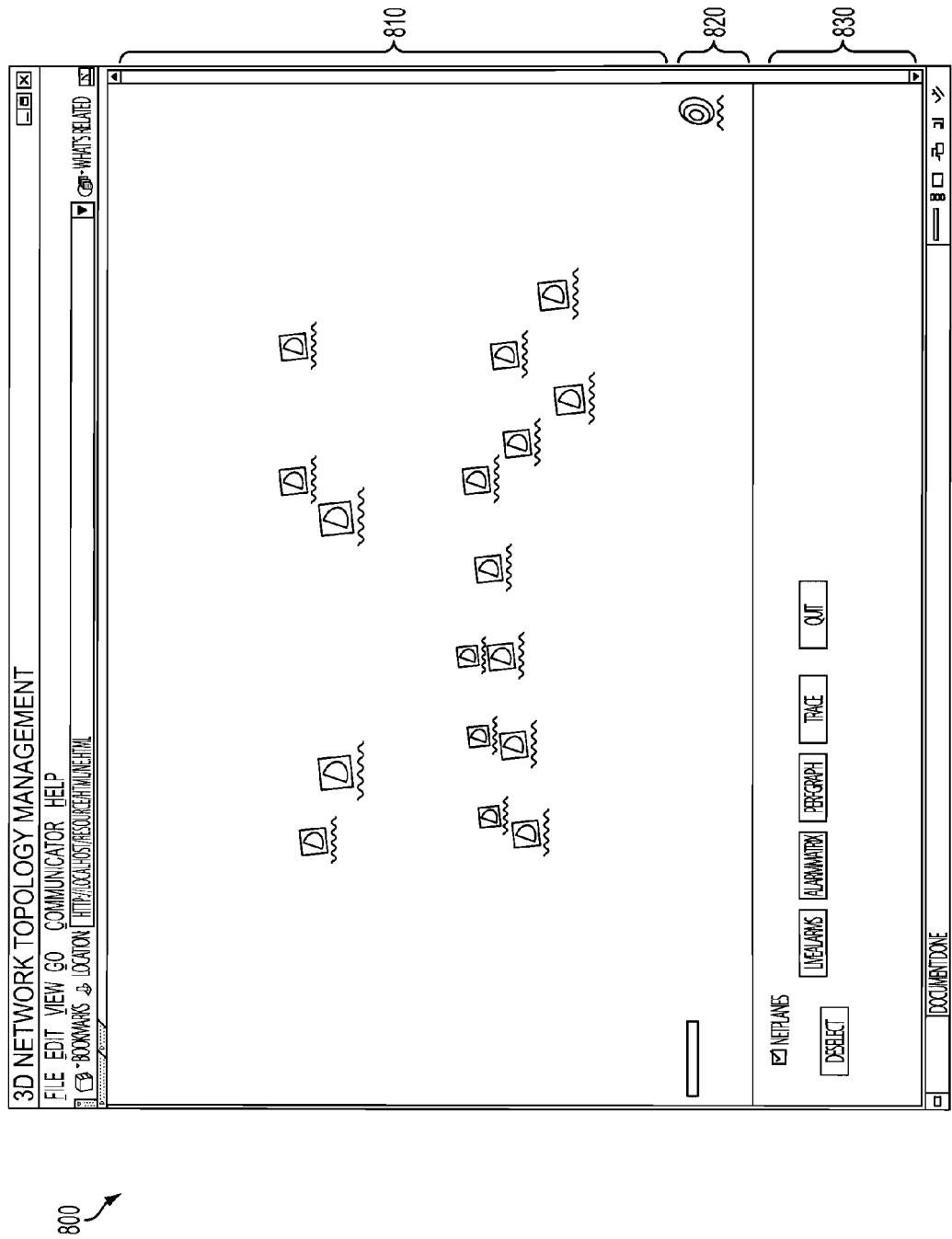

FIG. 8 illustrates yet another exemplary graphical user interface 800 consistent with the present invention. In FIG. 8, the graphical user interface 800 allows an operator to visualize and navigate a network, such as network 110, in three dimensions. The graphical user interface 800 may, for example, be provided as a standard Web browser virtual reality modeling language (VRML) plug-in.

The graphical user interface 800 includes a network topology window 810, navigation tools 820, and management tools 830. In the network topology window 810, the network may be broken down into a group of logical network planes (e.g., Switching planes, Transmission planes, Signaling planes, Customer Access planes, etc.). This provides a network operator with a convenient way to analyze a particular portion of the network of interest to that operator.

The network topology window 810 also illustrates how the individual logical planes and the network elements within those planes are interconnected. A network operator of the system may for example, define the logical planes and the association between planes and network elements. Network elements displayed in the network topology window 810 may be colored according to the their alarm status in real-time. By displaying the alarm status of network elements in the network and the interconnection of those network elements to other network elements in the network 110, network operators may quickly determine problem areas and how they affect the rest of the network 110.

The navigation tools 820 allow a network operator to "walk" the network in the network topology window 810. The operator may zoom in and out in order to get a closer or more distant view of the network, rotate the logical planes in the network, and the like.

The management tools 830 include a NetPlanes button, a Deselect button, a LiveAlarms button, an AlarmMatrix button, a PerfGraph button, a Trace button, and a Quit button. The NetPlanes button allows for different logical planes to be toggled in and out of the network topology window 810. The operator may select one or more network elements in the network topology window 810 by, for example, clicking on them. The Deselect button allows for selected network elements to be deselected. As in more traditional two-dimensional network topology displays, an operator may select network elements in 3D space and invoke operations on them or open other informational and real-time windows by clicking on the "LiveAlarms," "AlarmMatrix," or "PerfGraph" buttons. By selecting a network element on one plane and clicking on the "Trace" button, all "affected" network elements and links on other planes and links between planes will be highlighted. The "Quit" button exits the 3D view and returns to a login screen.

Unlike standard two-dimensional map representations of network topologies, the graphical user interface 800 offers the following unique advantages. The network topology window 810 automatically controls the level of detail of displayed information. For example, as operators "walk the network," the labels for network elements in the current locale of the operator's view get displayed automatically. This allows for uncluttered displays of large network data sets with only relevant information shown in greater detail.

The network topology window 810 allows operators to visualize network topology more naturally. The network topology window 810 shows relationships between logical layers of the network and helps operators visually relate faults to network topology faster. Once a problem is isolated to a particular network layer, an operator can further focus on network elements on this layer and turn off displaying other layers.

Unlike conventional network displays, operators can stay within the context of a single web browser frame as they navigate the network. They do not have to "pop-up" numerous windows on the desktop to "drill down the network" (e.g., going from a customer circuit view into the SONET ring that carries that circuit).

Exemplary Processing

Figure 9:
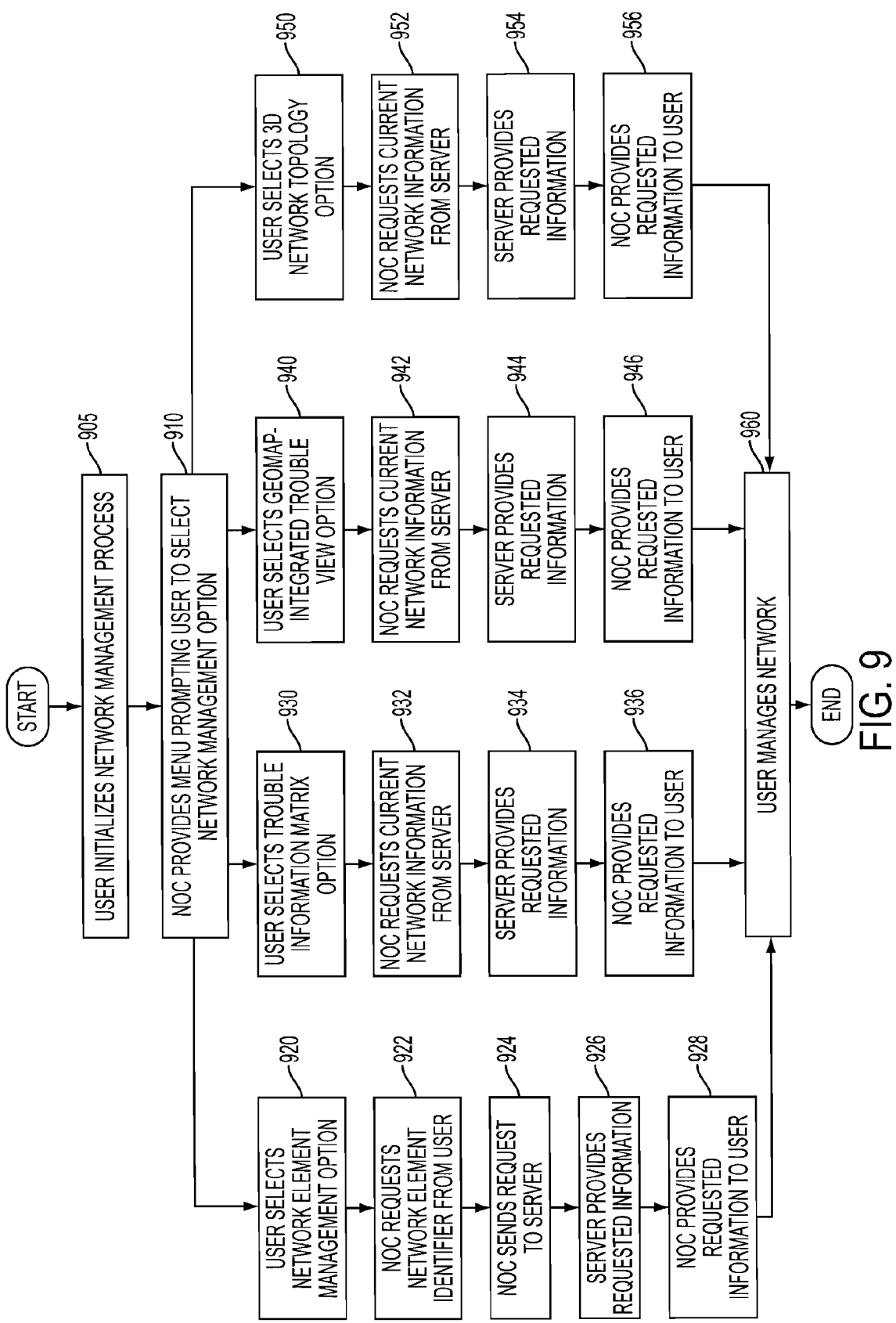
FIG. 9 illustrates an exemplary process, consistent with the present invention, that improves management of a network.

FIG. 9 illustrates an exemplary process, consistent with the present invention, to improve management of a network, such as network 110. Processing may begin with a user (e.g., a network engineer) initializing a management process at the network operations center 140 [act 905]. This initialization procedure may involve the user double-clicking an icon on a screen at the network operations center 140, typing in a command, or some other well-known technique. The initialization procedure may also involve some type of well-known log-in process by which the user may enter an identifier and password that are authenticated by the network operations center 140.

Figure 10:
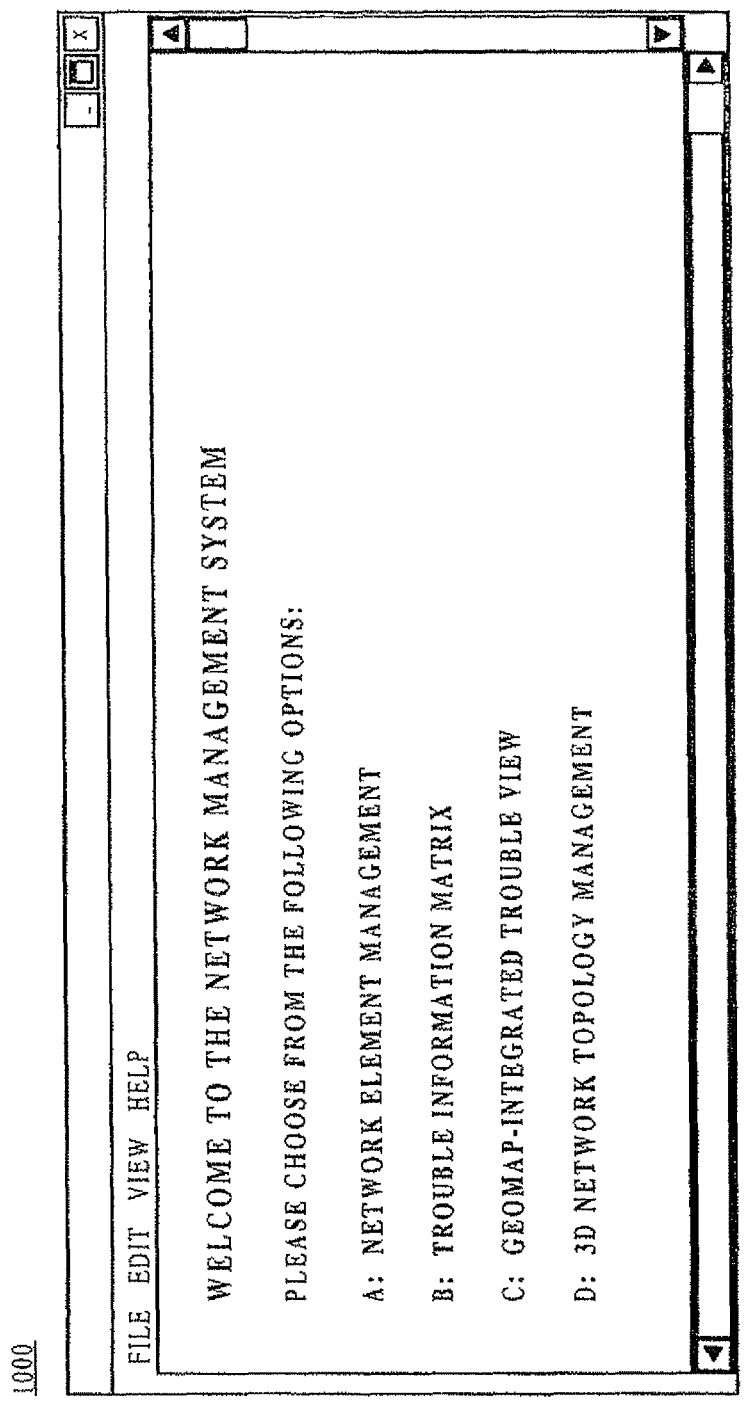
FIG. 10 illustrates an exemplary graphical user interface that may be provided to the user of a network operations center.

The network operations center 140 may then provide a menu of possible network management options [act 910]. FIG. 10 illustrates an exemplary graphical user interface 1000 that may be provided to the user of network operations center 140. As illustrated, the graphical user interface 1000 requests the selection of a network management option. The options may include a network element management option, a trouble information matrix option, a geomap-integrated trouble view option, and a three-dimensional (3D) network topology management option.

Assume that the user selects the network element management option [act 920]. The network operations center 140 may request the user to provide the identity a network element of interest [act 922]. Upon entry of a network element identifier, the network operations center 140 may request information about the network element from the server 130 [act 924]. In response, the server 130 may transmit information, for example, from database 310, that pertains to the requested network element [act 926].

Upon receipt of the information from server 130, the network operations center 140 may provide the user with the requested information [act 928]. The information may be provided, for example, via the graphical user interface 500 illustrated in FIG. 5. As illustrated therein, the graphical user interface 500 may provide the user with detailed alarm information for a particular network element (e.g., ABCDEFG03H). The user may monitor alarms associated with the requested network element in an active alarm window 505. The user may also monitor alarms that have most recently occurred in a most recent alarms window 510. The user may use the graphical user interface 500 to manage the network [act 960].

Assume that the user selects the trouble information matrix option [act 930]. Upon the selection of the trouble information matrix option, the network operations center 140 may request current network information from the server 130 [act 932]. In response, the server 130 may transmit information from database 330 and/or database 310 to the network operations center 140 [act 934].

Upon receipt of the information from server 130, the network operations center 140 may provide the user with the requested information [act 936]. The information may be provided, for example, via the graphical user interface 600 illustrated in FIG. 6. As illustrated therein, the graphical user interface 600 may provide the user with a summary view of the state of each network element in the network. This allows the user to readily determine the number of alarms associated with a particular network element and the severity of those alarms. The graphical user interface 600 simplifies management of large-scale telecommunications networks by allowing the user to quickly retrieve detailed information about any network element in the network. The user may use the graphical user interface 600 to manage the network [act 960].

Assume that the user selects the geomap-integrated trouble view option [act 940]. Upon the selection of the geomap-integrated trouble view option, the network operations center 140 may request current network information from the server 130 [act 942]. In response, the server 130 may transmit information from database 330 and/or database 310 to the network operations center 140 [act 944].

Upon receipt of the information from server 130, the network operations center 140 may provide the user with the requested information [act 946]. The information may be provided, for example, via the graphical user interface 700 illustrated in FIG. 7. As illustrated therein, the graphical user interface 700 may provide the user with geographic locations of points of presence and network elements in the network. The graphical user interface 700 may also map trouble tickets to objects in the network. The user may readily determine the geographic location of alarms in the network. The user may use the graphical user interface 700 to manage the network [act 960].

Assume that the user selects the 3D network topology option [act 950]. Upon the selection of the 3D network topology option, the network operations center 140 may request current network information from the server 130 [act 952]. In response, the server 130 may transmit information from database 330 and/or database 310 to the network operations center 140 [act 954].

Upon receipt of the information from server 130, the network operations center 140 may provide the user with the requested information [act 956]. The information may be provided, for example, via the graphical user interface 800 illustrated in FIG. 8. As illustrated therein, the graphical user interface 800 may provide the user with a real-time, three-dimensional model of the network. Network elements in the model may be shaded in order to depict current states of the network elements. The graphical user interface 800 provides the user with the ability to navigate through the network, to represent the network as a logical layer of planes (e.g., customer access, switching, transmission, etc.), and to readily determine how a particular alarm affects the overall network. The user may use the graphical user interface 800 to manage the network [act 960].

Conclusion

Systems and methods, consistent with the present invention, provide a mechanism to improve network management. The mechanism provides a user (e.g., a network engineer) with several graphical user interfaces with which to manage network operations. The graphical user interfaces allow the user to easily assimilate a large amount of information thereby facilitating the management of any sized network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Also, while a series of steps has been described with regard to FIG. 9, the order of the steps may be varied in other implementations consistent with the present invention. No element, step, or instruction used in the description of the present application should be construed as critical or essential to the invention unless explicitly described as such.

The scope of the invention is defined by the following claims and their equivalents.

The invention claimed is:

1. A method utilizing a graphical user interface for managing a network having a plurality of network devices, comprising:
    associating events in the network with respective ones of the plurality of network devices;
    providing a first geographical map to the graphical user interface, the first geographical map displaying locations of each of the plurality of network devices and indicating which of the plurality of network devices are associated with at least one event; and
    managing the network using the first geographical map, the managing including detecting selection of a network device in the plurality of network devices and providing to the graphical user interface a second geographical map including a more detailed view of a geographical area around the selected network device in response to the detecting while simultaneously maintaining no more than a portion of the first geographical map visible on the graphical user interface without changing size of the portion of the first geographical map, said maintaining including overlaying all but said portion of said first geographical map with no more than a portion of said second geographical map, thereby displaying said portion of the first map simultaneously with displaying said second map on said graphical user interface.

2. The method of claim 1 where the network devices include points of presence and network elements.

3. The method of claim 1 further comprising:
    selecting a network device having at least one associated event; and
    providing information regarding the at least one associated event.

4. The method of claim 1 where the first geographical map further displays a state of each network device.

5. The method of claim 1, where the managing the network further comprises:
    providing, in response to said detecting the selection, an option that allows for trouble tickets that are associated with the selected network device to be displayed,
    detecting selection of the option, and
    providing the trouble tickets to a display.

6. The method of claim 1, where one network device, of the plurality of network devices, includes a point of presence, the point of presence being associated with a group of network elements, and
    where the first geographical map displays information indicating whether a network element in the group of network elements is associated with an event.

7. A device including a graphical user interface for managing a network having a plurality of network devices, comprising:
    a memory to store instructions; and
    a processor to execute the instructions to:
        associate events in the network with respective ones of the plurality of network devices,
        provide a first geographical map to the graphical user interface, the first geographical map displaying locations of the plurality of network devices and indicating which of the network devices are associated with at least one event,
        detect selection of a network device in the plurality of network devices, and
        provide, to the graphical user interface, a second geographical map including a more detailed view of a geographical location around the selected network device in response to the detecting while simultaneously maintaining no more than a portion of the first geographical map visible on the graphical user interface without changing size of the portion of the first geographical map, said maintaining including overlaying all but said portion of said first geographical map with no more than a portion of said second geographical map, thereby displaying said portion of the first map simultaneously with displaying said second map on said graphical user interface.

8. The device of claim 7 where the network devices include points of presence and network elements.

9. The device of claim 7 where the processor is further to:
    provide event information in response to selection of a network device having at least one event associated therewith.

10. The device of claim 7 the processor is further to:
    display a state of each network device on the first geographical map.

11. The device of claim 7, where, when providing the first geographical map, the processor is to:
    provide, in response to said detecting the selection, an option that allows for trouble tickets that are associated with the selected network device to be displayed,
    detect selection of the option, and
    provide the trouble tickets to a display.

12. The device of claim 7, where one network device of the plurality of network devices includes a point of presence, the point of presence being associated with a group of network elements, and
    where the first geographical map displays information indicating whether a network element in the group of network elements is associated with an event.

13. A storage device containing instructions for controlling at least one processor to perform a method utilizing a graphical user interface for managing a network having a plurality of network devices, the method comprising:
    associating events in the network with respective ones of the plurality of network devices;
    providing a first geographical map to the graphical user interface, the first geographical map displaying locations of each of the plurality of network devices and indicating, which of the plurality of network devices are associated with at least one event; and
    managing the network using the first geographical map, the managing including detecting selection of a network device in the plurality of network devices and providing to the graphical user interface a second geographical map including a more detailed view of a geographical area around the selected network device in response to the detecting while simultaneously maintaining no more than a portion of the first geographical map visible on the graphical user interface without changing size of the portion of the first geographical map, said maintaining including overlaying all but said portion of said first geographical map with no more than a portion of said second geographical map, thereby displaying said portion of the first map simultaneously with displaying said second map on said graphical user interface.

14. The storage device of claim 13 where the network devices include points of presence and network elements.

15. The storage device of claim 13 where the method further comprises:
   selecting a network device having at least one associated event; and
   providing information regarding the at least one associated event.

16. The storage device of claim 13 where the first geographical map further displays a state of each network device.

17. The storage device of claim 13, where the managing the network further comprises:
   providing, in response to said detecting the selection, an option that allows for trouble tickets that are associated with the selected network device to be displayed,
   detecting selection of the option, and
   providing the trouble tickets to a display.

18. The storage device of claim 13, where one network device of the plurality of network devices includes a point of presence, the point of presence being associated with a group of network elements, and
   where the first geographical map displays information indicating whether a network element in the group of network elements is associated with an event.

* * * * *